(12) United States Patent
Chevassus et al.

(10) Patent No.: US 6,342,878 B1
(45) Date of Patent: Jan. 29, 2002

(54) INPUT PERIPHERAL FOR COMPUTER WITH AUTOMATIC SWITCHING BETWEEN 3D AND 2D OPERATION MODES, AND ITS INTERACTION PROCESS WITH A DISPLAY SCREEN

(75) Inventors: Nicolas Chevassus, Chaville; Matthieu Rouzeval, Castelginest, both of (FR)

(73) Assignee: Aerospatiale Societe Nationale Industrielle, Paris (FR)

( * ) Notice: Subject to any disclaimer, the term of this patent is extended or adjusted under 35 U.S.C. 154(b) by 0 days.

(21) Appl. No.: 09/145,420

(22) Filed: Sep. 1, 1998

(30) Foreign Application Priority Data

Sep. 18, 1997 (FR) .............................. 97 11646

(51) Int. Cl.⁷ ................................ G09G 5/08
(52) U.S. Cl. ..................... 345/158; 345/157; 345/159; 345/160
(58) Field of Search ............... 345/157, 158, 345/159, 160

(56) References Cited

U.S. PATENT DOCUMENTS 5,019,809 A * 5/1991 Chen .................. 340/815.31
5,144,594 A   9/1992 Gilchrist
5,237,647 A   8/1993 Roberts et al.
5,774,113 A * 6/1998 Barnes .................. 345/156

FOREIGN PATENT DOCUMENTS

EP   0 420 500   4/1991

OTHER PUBLICATIONS

"Three–Dimensional Pointing Device" IBM Technical Disclosure Bulletin, vol. 37, No. 6A, Jun. 1, 1994, p. 597 XP000455898.

* cited by examiner

Primary Examiner—Richard Hjerpe
Assistant Examiner—Jean Lesperance
(74) Attorney, Agent, or Firm—Burns Doane Swecker & Mathis LLP

(57) ABSTRACT

Input peripheral for a computer with automatic switching between 3D and 2D operating modes, and its interaction process with a display screen.

A casing (10) containing a tracking type electromagnetic sensor (16) is fitted with a contactor (22) on one face (12) designed to be placed on a flat support. The contactor (22) makes the device automatically change from a 3D operating mode to a 2D operating mode when it is placed on a flat support, and vice versa when it is lifted off this support.

11 Claims, 2 Drawing Sheets

INPUT PERIPHERAL FOR COMPUTER WITH AUTOMATIC SWITCHING BETWEEN 3D AND 2D OPERATION MODES, AND ITS INTERACTION PROCESS WITH A DISPLAY SCREEN

DESCRIPTION

1. TECHNICAL DOMAIN

The invention mainly concerns an input peripheral for a computer.

This input peripheral may be used in most computer application domains. These domains include, but are not restricted to, visiting or building virtual worlds, computer aided design (CAD), video games, etc.

The invention also concerns a process for interaction between this type of input peripheral and a computer display screen.

2. STATE OF PRIOR ART

Input peripherals used on computers may be classified in three categories, depending on the type of action that they enable on an element such as a cursor displayed on the computer screen. Thus, depending on the type of input peripheral used, it is possible to move it in a single direction ("1D" mode), in two directions ("2D" mode) or in three directions ("3D" mode).

1D type input peripherals include the "arrow" keys on the computer keyboard.

These 1D devices, that form the simplest input peripherals, have very limited use. However note they are sometimes used with 2D devices to perform a three dimensional action on an element displayed on the screen. However this is not very convenient, and users need to use both hands for this operation alone; furthermore this device cannot be used to rotate the displayed element.

Most input peripherals are of the 2D type. This category includes conventional 2D mice, and trackball devices. Although these input devices are capable of controlling a two dimensional displacement of an element displayed on the computer screen, they cannot control the rotation which is essential when it is required to position and orient an object on the screen at the same time.

3D type input peripherals include all devices used in association with software for creating three dimensional virtual spaces on the screen. These devices are naturally adapted to displacement of an element in three dimensions to visit virtual worlds or digital models, for the construction of digital objects in CAD, etc. The main peripherals forming part of this category are 3D mice and "tracker" devices.

3D mice are 2D mice on which a mobile device such as a joystick, ball or other device has been added. For example, this type of device is described in documents U.S. Pat. Nos. 5,298,919 and 4,933,670.

3D mice have a number of disadvantages, mainly related to the fact that the displacement control of the element displayed on the screen in the third direction is performed by a specific device, which must be maneuvered in addition to the displacement of the mouse on its support. This requires special training for users of these devices. Furthermore, the mobile element providing control in the third direction frequently has limited movements, which is a disadvantage when a large displacement is necessary along this third direction. Finally, 3D mice usually do not have any controls for rotating or orienting the displayed element.

Trackers are devices that are placed in the user's hand and in which a sensor is placed, for example of the electromagnetic type. This sensor detects a low frequency magnetic field emitted by a stationary external source. When the user moves the tracker and modifies its rotation, the magnetic field received by the sensor varies. Signals emitted by the sensor are therefore representative of the position and rotation of the tracker in space. These devices are described particularly in document U.S. Pat. No. 5,237,647.

Compared with 3D mice, trackers have the advantage that they can be used by a person without any special training, because all movements of the user's hand are transmitted to the element displayed on the screen in exactly the same way regardless of the direction of the movement. Furthermore, they can be used to control the rotation of this element.

However, trackers have the disadvantage that they are too sensitive when precise positioning of an element is necessary in a three dimensional scene displayed on the screen, or when execution of a specific task makes it necessary to work temporarily into 2D mode.

DESCRIPTION OF THE INVENTION

The main purpose of the invention is a new type of input peripheral designed to change automatically from 3D operating mode to 2D operating mode and vice versa, particularly to enable a user without any special training to be able to work in a three dimensional space, while benefiting from the precision provided by two dimensional action whenever he wishes, when necessary for the task to be executed.

In the invention, this result is obtained by an input peripheral for a computer, comprising a mobile casing designed to be held by the user, and means of detecting the three dimensional position and rotation of the casing, characterized by the fact that a two state contactor is placed on one surface of the casing designed to be placed on a plane support and to occupy a first state corresponding to a two dimensional operating mode of the peripheral when the casing is placed on the support, and a second state corresponding to a three dimensional operating mode of the peripheral when the casing is lifted off the support.

When, this type of input peripheral is used, all tasks normally done in a three dimensional space using existing 3D input peripherals can be carried out in the same way as with a conventional tracker. However when high precision is necessary, or when necessary for the task to be accomplished, it is possible to work temporarily in 2D mode by placing the casing on a support. This action has the immediate consequence of putting the input peripheral into its two dimensional operating state so that it then behaves like a traditional 2D mouse.

In one preferred embodiment of the invention, the means of detecting the three dimensional position and rotation comprise an electromagnetic sensor installed in a casing an and electronic preprocessing circuit placed outside the casing and connected to the sensor by an electric conductor. The electromagnetic sensor is sensitive, in a known manner, to a three dimensional magnetic field produced by a stationary external source.

According to one characteristic similar to what is found on most existing input peripherals, the casing is preferably equipped with at least one button to start computer processing. This button may be used particularly when a mobile cursor representing the position of the casing in the virtual space on the screen, is on one of a set of icons displayed on the screen, or is on an object in the virtual scene represented on the screen. This can then trigger execution of previously defined computer processing associated with this icon or this object.

The casing then contains an electronic circuit for shaping signals output by the contactor and by the button.

Means of detecting the three dimensional position and rotation output signals representing the coordinates x, y and z and the rotations $\alpha$, $\beta$, $\gamma$ of the casing in a fixed orthonormal coordinate system R (O, i, j, k) related to the support, and for which the i and j axes are in the plane of the support.

Another purpose of the invention is a process for interaction between a peripheral thus defined and a computer display screen. This process includes the following steps:

determine the operating mode of the peripheral;

calculate the coordinates x', y', z' and the rotations $\alpha'$, $\beta'$, $\gamma'$ of a 3D cursor displayed on the screen (34) in an orthonormal coordinate system R' (O', i', j', k') related to a virtual scene represented on the screen, starting from signals output by the means (16) of detecting a three dimensional position and rotation, in three dimensional operating mode;

calculate the coordinates x", y" and the rotation $\alpha$" of a 2D cursor in an orthonormal coordinate system R" (O", i", j", k") related to the screen, for which the i" and j" axes are located in the plane of the screen, starting from the signals output by means of detecting the three dimensional position and rotation in two dimensional operating mode.

In three dimensional operating mode, a movement of the casing in coordinate system R from a position P1 with coordinates $x_1$, $y_1$, $z_1$ and rotations $\alpha_1$, $\beta_1$, $\gamma_1$, to a position P2 with coordinates $x_2$, $y_2$, $z_2$ and rotations $\alpha_2$, $\beta_2$, $\gamma_2$, will displace the 3D cursor in the R' coordinate system from a position P'1 with coordinates $x'_1$, $y'_1$, $z'_1$ and rotations $\alpha'_1$, $\beta'_1$, $\gamma'_1$, to a position P'2 with coordinates $x'_2$, $y'_2$, $z'_2$ and rotations $\alpha'_2$, $\beta'_2$, $\gamma'_2$, calculated using the following relations:

$$x'_2 = x'_1 + Cx(x_2 - x_1)$$

$$y'_2 = y'_1 + Cy(y_2 - y_1)$$

$$z'_2 = z'_1 + Cz(z_2 - z_1)$$

$$\alpha'_2 = \alpha'_1 + C\alpha(\alpha_2 - \alpha_1)$$

$$\beta'_2 = \beta'_1 + C\beta(\beta_2 - \beta_1)$$

$$\gamma'_2 = \gamma'_1 + C\gamma(\gamma_2 - \gamma_1)$$

in which Cx, Cy, Cz, C$\alpha$, C$\beta$ and C$\gamma$ represent gains that can be configured in x, y, z, $\alpha$, $\beta$, $\gamma$ respectively.

In two dimensional operating mode, moving the casing on the support in the R coordinate system from a position P1 with coordinates $x_1$, $y_1$ and rotation $\gamma_1$ to a position P2 with coordinates $x_2$, $y_2$ and rotation $\gamma_2$ will move the 2D cursor in the R" coordinate system from a position P"1 with coordinates $x"_1$, $y"_1$ and rotation $\gamma"_1$ to a position P"2 with coordinates $x"_2$, $y"_2$ and rotation $\gamma"_2$ calculated using the following relations:

$$x"_2 = x"_1 + Fx(x_2 - x_1)$$

$$y"_2 = y"_1 + Fy(y_2 - y_1)$$

$$\gamma"_2 = \gamma"_1 + F\gamma(\gamma_2 - \gamma_1)$$

in which Fx, Fy and F$\gamma$ are gains that can be configured in x, y and $\gamma$ respectively, position P1 being the initial position of the casing when the peripheral changes to two dimensional operating mode, position P"1 being the final position of the 2D cursor during the previous changeover from two dimensional operating mode to three dimensional operating mode.

BRIEF DESCRIPTION OF THE FIGURES

We will now describe a preferred but not restrictive embodiment of the invention, with reference to the attached drawings in which.

DETAILED DESCRIPTION OF AN EMBODIMENT

Figure 1:
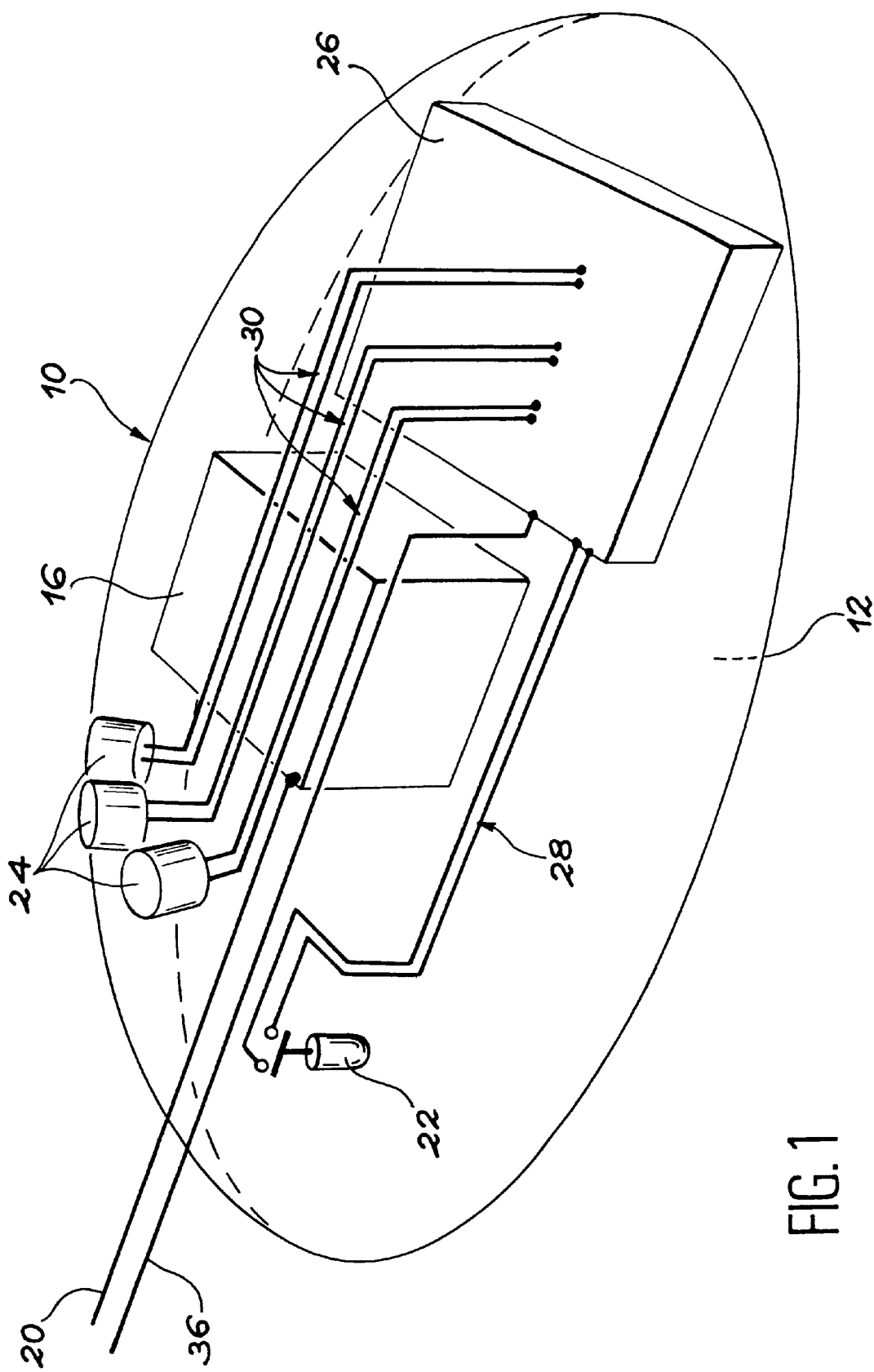
FIG. 1 is a perspective view schematically representing the casing of an input peripheral conform with the invention and the elements contained in it.

Reference 10 in FIG. 1 denotes a mobile casing of an input peripheral according to the invention in a general manner, designed to be used with a computer. The casing 10 is shown as if it were transparent, so that the elements contained in it can be seen in the figure. The external shape of this casing 10 is designed so that a user can hold it in his hand, move it about and rotate it at will with in a three dimensional working space or volume. Consequently, the outside surface of casing 10 may include recesses (not shown) into which the user's fingers fit comfortably.

The outside surface of the mobile casing 10 of the input peripheral according to the invention also has an approximately plane general configuration of its lower surface 12. The user can place this surface 12 of the casing 10 on a plane and generally horizontal support, as shown diagrammatically in 14 in FIG. 3. More precisely, the casing 10 may be displaced and rotated on support 14 at will, in the same way as a conventional 2D computer mouse, when its surface 12 is placed on this support.

The input peripheral according to the invention also comprises means of detecting the three dimensional position and rotation of the casing 10 inside the working space in which the user can displace and rotate this casing. In the preferred embodiment shown in the figures, these means of detecting the three dimensional position and rotation of casing 10 comprise an electromagnetic sensor 16 mounted inside this casing. A stationary source 17 (FIG. 3) placed on the table supporting the computer display screen or on any other fixed location in the installation, creates a low frequency 3D magnetic field in the working area. The electromagnetic sensor 16 is sensitive to changes to this 3D magnetic field generated by its own displacements.

The stationary source 17 is located at the origin of a fixed orthonormal coordinate system R (O, i, j, k) in which the electromagnetic sensor 16 measures the variations of coordinates x, y, z and rotations $\alpha$, $\beta$, $\gamma$ of casing 10 inside the working space in which the user can move this casing.

Figure 2:
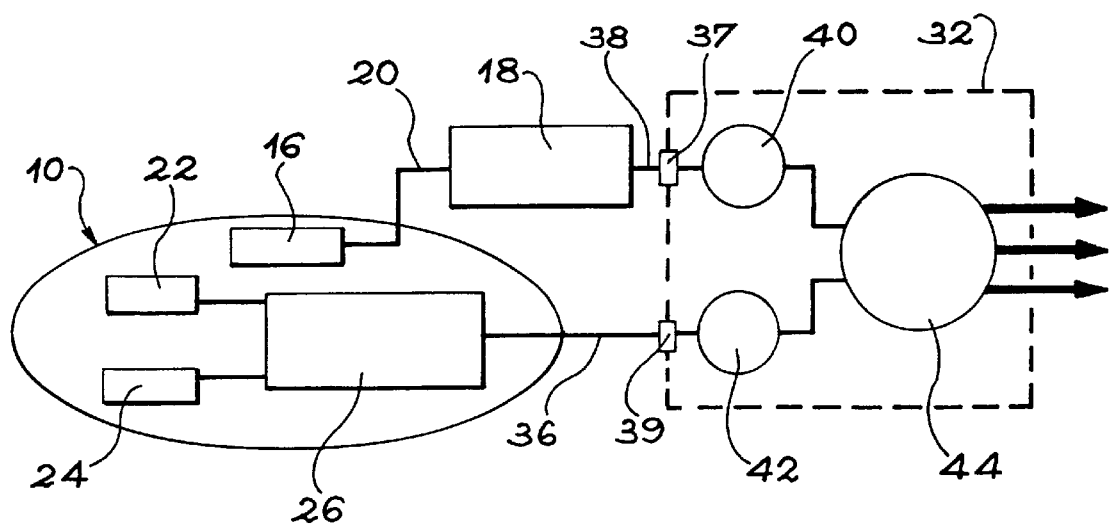
FIG. 2 schematically shows an example embodiment of the input peripheral according to the invention, including the casing in FIG. 1 and elements external to this casing, particularly for its connection with the system unit of the associated computer.

In particular, the electromagnetic sensor 16, also called a "3D tracker" may be of the "Fastrak" type made by the "Polhemus" company or the "Flock of Birds" type made by the "Ascension" company. It is generally used with an electronic preprocessing circuit (18) (FIG. 2). More precisely, the electronic preprocessing circuit 18 is placed inside a stationary casing located outside the mobile casing 10, and is electrically connected to the electromagnetic sensor 16 by an electric conductor 20 forming a first serial link between the casing 10 and the rest of the installation.

The assembly comprising the electromagnetic sensor 16, the stationary source 17 and the electronic preprocssing circuit 18 is well known to the expert in the field, and therefore it will not be described in detail. For example, this type of assembly is described in document U.S. Pat. No. 5,237,647.

Note that as a variant, different means of detecting the three dimensional position and rotation of the casing 10 may be used, for example based on ultrasound or light systems or by means of accelerometers or gyroscopes.

According to the invention, a two-state contactor 22 controlling a switch is placed on the lower surface 12 of casing 10. More precisely, the assembly of contactor 22 on surface 12 is made such that the contactor automatically changes state when the casing 10 is placed on the plane support 14, and when it is lifted off this support. Thus, contactor 22 may for example be in a closed state when the casing is placed on its support 14 and in an open state when it is lifted off this support.

The closed state of contactor 22 is a first state for this contactor, corresponding to two dimensional operating mode of the peripheral. Conversely, the open state of contactor 22 forms a second state corresponding to three dimensional operating mode of the peripheral.

Therefore the presence of contactor 22 on surface 12 of casing 10 automatically changes the input peripheral according to the invention from 2D operating mode to 3D operating mode and vice versa, depending on whether or not it is placed on a support 14.

Apart from its surface 12 designed to be placed on support 14, casing 10 is provided with one to three buttons 24 on its outside surface, to trigger computer processing controlling switches. Buttons 24 are designed to perform functions similar to those carried out by buttons normally used on 2D mice with conventional design. Therefore, these elements are well known to the expert in the field, and therefore will not be described in detail.

An electronic shaping circuit 26 is also placed inside the casing 10 of the peripheral. This electronic circuit 26 is electrically connected to the switch of contactor 22 and to the switches associated with buttons 24, through electric conductors 28 and 30. Its functions are to eliminate bounce related to state changes of the button and contactor switches, and to encode the state of these switches. The function of this electronic circuit 26 is similar to the function of electronic shaping circuits used on existing 2D mice, and therefore will not be described in detail.

As illustrated particularly in FIG. 2, coded signals output from the shaping electronic circuit 26 are transmitted to the computer system unit 32 controlling the display device screen 34 (FIG. 3) through an electric conductor 36. This electric conductor 36 forms a second serial link between the mobile casing 10 of the input peripheral and the computer system unit 32.

In practice, electric conductors 20 and 36 output from casing 10 are grouped together in the form of a cable 38 (FIG. 3) connecting this casing to the rest of the installation.

The electronic preprocessing circuit 18 is connected to a first serial port 37 on the computer system unit 32 through a first serial link materialized by an electric conductor 38. Furthermore, the electric conductor 36 materializing the second serial link is connected to a second serial port 39 of the computer system unit 32.

As shown schematically in FIG. 2, the signals accepted through the first serial port 37 are processed inside the computer system unit 32 by a first software module 40 that retrieves the coordinates x, y, z and the rotations $\alpha$, $\beta$, $\gamma$ from the electromagnetic sensor 16. Similarly, data accepted by the second serial port 39 on the system unit 32 are processed in a second software module 42, which retrieves the state and state transitions of switches of contactor 22 and buttons 24 of the input peripheral according to the invention.

The first software module 40 is a software module that is conventionally associated with the assembly consisting of the electromagnetic sensor 16, the stationary magnetic field source 17 and the electronic preprocessing circuit 18 in installations using a tracker. Therefore, it is well known to the expert in the field, and therefore will not be described in detail.

Similarly, the second software module 42 is similar to the software module normally associated with buttons on 2D mice with conventional design. Therefore, it is well known to the expert in the field, and therefore will not be described in detail either.

As also shown schematically in FIG. 2, data output from the first software module 40 and the second software module 42 will be used inside the computer system unit 32 by a third software module 44. This third software module 44 takes account of status changes of the contactor 22 and calculates the coordinates and rotations of a 2D cursor 45 or a 3D cursor 46 (FIG. 3), depending on whether the input peripheral is in two dimensional operating mode or in three dimensional operating mode.

More precisely, when the casing 10 is placed on its support 14, in other words when the contactor 22 is in its first state, the third software module 44 automatically acts according to a two dimensional operating mode of the peripheral, whereas it acts according to a three dimensional operating mode of the peripheral when the casing 10 is lifted from its support 14, in other words when the contactor 22 is in its second state.

In the two dimensional operating mode, displacements and changes in rotation of the casing 10 on the support 14 result in displacements and changes to the rotation of the 2D cursor 45 in the plane of the screen 34.

On the other hand in three dimensional operating mode, displacements and changes in the rotation of the casing 10 within the working area result in displacements and changes in the rotation of the 3D cursor 46 in a virtual space corresponding to a 3D scene displayed on the screen 34.

Figure 3:
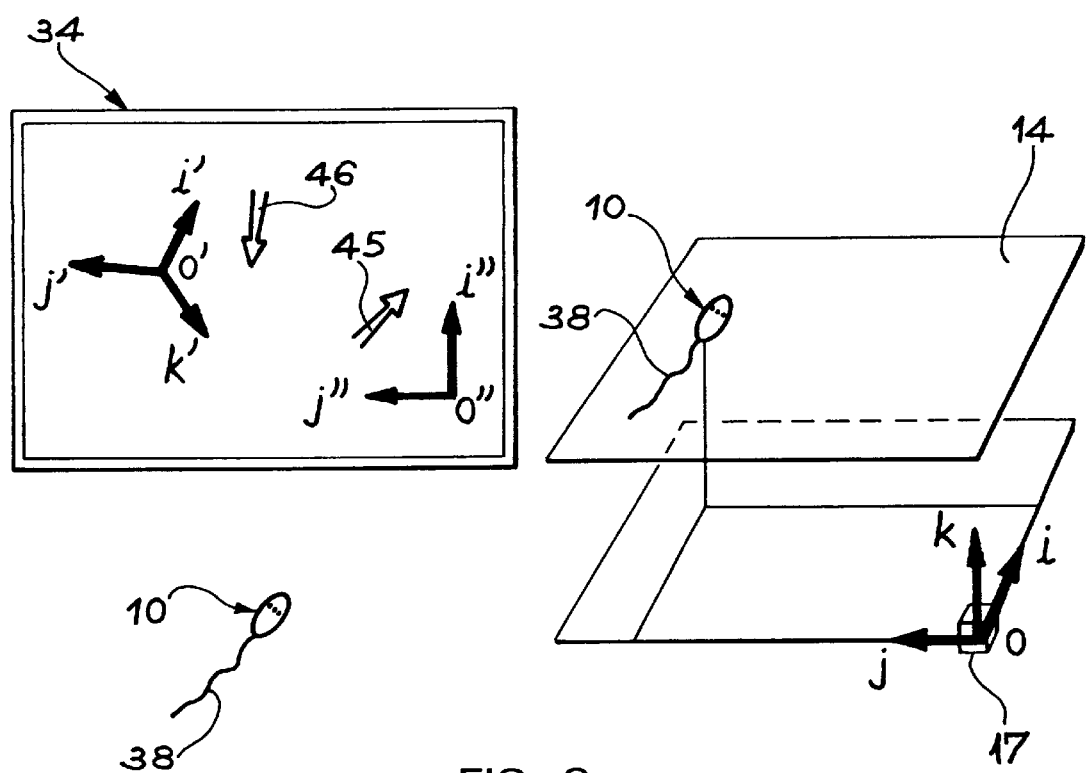
FIG. 3 is a very schematic perspective view designed to explain coordinate changes made in the system unit, starting from the signals output by the input peripheral to be able to represent the position and rotation of the casing of the input peripheral, by a 2D cursor or by a 3D cursor on the computer display screen.

As illustrated schematically in FIG. 3, in the two dimensional operating mode of the peripheral, the third software module 44 transforms the coordinates x, y and z and the rotations $\alpha$, $\beta$, $\gamma$ of casing 10 in the fixed orthonormal coordinate system R (O, i, j, k) related to support 14 into two coordinates x" and y" and a rotation $\gamma$" of the 2D cursor 45 in an orthonormal system R" (O", i", j", k") related to the screen 34. More precisely, when the O, i, j plane is parallel to the support plane 14, and the i and j vectors are pointing towards the back and the left respectively and the vector k is pointing upwards, the O", i", j" plane is coincident with the plane of the screen and the vectors i" and j" are pointing upwards and towards the left on the screen, respectively.

Consequently, moving the casing 10 on its support 14 away from the user, in other words in the direction of the vector i in the R coordinate system, will result in a corresponding upward displacement of the 2D cursor 45 on the screen 34.

In three dimensional operating mode of the peripheral, the third software module 44 transforms coordinates x, y, z and rotations α, β, γ of casing 10 in the fixed orthonormal system R(O, i, j, k) into coordinates x', y', z' and rotations α', β', γ' of the 3D cursor 46 in an orthonormal coordinate system R' (O', i', j', k') related to a virtual space corresponding to a scene displayed on the screen 34.

Consequently, in this 3D operating mode, a displacement and change in the rotation of casing 10 in the working area result in a corresponding displacement and change in the rotation of the 3D cursor 46 in the virtual scene represented on the screen 34.

The calculations carried out by the third software module 44 in each of the two operating modes of the peripheral will now be explained.

In two dimensional operating mode, the third software module 44 carries out the following transformations:

$$x''_2 = x''_1 + Fx(x_2 - x_1)$$
$$y''_2 = y''_1 + Fy(y_2 - y_1)$$
$$\gamma''_2 = \gamma''_1 + F\gamma(\gamma_2 - \gamma_1)$$

In these relations, $x_1$ and $y_1$ represent the coordinates and $\gamma_1$ represents the rotation of the casing 10 in the R coordinate system, in an initial position P1 of the casing 10 corresponding to the moment at which the casing is placed on the support 14 and triggers the changeover of the input peripheral into 2D operating mode.

The terms $x''_1$ and $y''_1$ represent the coordinates and $\gamma_1$ the rotation of the 2D cursor 45 in the R" coordinate system, in an initial position P"1 of this cursor corresponding to position P1 of casing 10. This initial position P"1 of 2D cursor 45 is also the final position of this cursor the last time the peripheral changed from 2D operating mode to 3D operating mode.

Furthermore, the terms $x_2$ and $y_2$ represent the coordinates and $\gamma_2$ the rotation of the casing 10 in the R coordinate system at the moment considered, in a position P2 of the casing on the support.

The terms $x''_2$ and $y''_2$ represent the coordinates and $\gamma''_2$ represents the rotation of the 2D cursor 45 in the R" coordinate system at the same time, in a position P"2 of this cursor corresponding to the position P2 of casing 10.

Finally, terms Fx, Fy and Fγ denote configurable gains in x, y and γ respectively, in this 2D operating mode.

Furthermore, when the peripheral is in its three dimensional operating mode, the third software module 44 performs the following transformations:

$$x'_2 = x'_1 + Cx(x_2 - x_1)$$
$$y'_2 = y'_1 + Cy(y_2 - y_1)$$
$$z'_2 = z'_1 + Cz(z_2 - z_1)$$
$$\alpha'_2 = \alpha'_1 + C\alpha(\alpha_2 - \alpha_1)$$
$$\beta'_2 = \beta'_1 + C\beta(\beta_2 - \beta_1)$$
$$\gamma'_2 = \gamma'_1 + C\gamma(\gamma_2 - \gamma_1)$$

In these relations, $x_1$, $y_1$, $z_1$ and $\alpha_1$, $\beta_1$, $\gamma_1$ represent the coordinates and rotations respectively of casing 10 in coordinate system R, in an initial position P1 of this casing.

The terms $x_2$, $y_2$, $z_2$ and $\alpha_2$, $\beta_2$, $\gamma_2$ represent the coordinates and rotations respectively of casing 10 in coordinate system R in a position P2 of this casing corresponding to the moment considered.

The terms $x'_1$, $y'_1$, $z'_1$ and $\alpha'_1$, $\beta'_1$, $\gamma'_1$ represent the coordinates and rotations respectively of the 3D cursor 46 in the R' coordinate system, in a position P'1 corresponding to position P1 of the casing.

The terms $x'_2$, $y'_2$, $z'_2$ and $\alpha'_2$, $\beta'_2$, $\gamma'_2$ represent the coordinates and rotations respectively of the 3D cursor in the R' coordinate system, in a position P'2 corresponding to position P2 of the casing.

Finally, Cx, Cy, Cz, Cα, Cβ and Cγ represent configurable gains in x, y, z, α, β, γ respectively in the 3D operating mode.

The above description clearly shows that the input peripheral according to the invention is an innovative device, which automatically changes from two dimensional operating mode to three dimensional operating mode and vice versa, without the need to use several distinct devices. This is a valuable advantage for users who need to work alternately in a three dimensional virtual space and in a two dimensional plane. From this point of view, it should be noted that the two dimensional operating mode can also be used to move the cursor in a plane other than the plane on the screen, by making an additional transformation of the data corresponding to a projection of coordinates and the rotation in this other plane.

Furthermore, in an embodiment not shown, the mobile casing of the input peripheral may also contain elements normally used in a conventionally designed 2D mouse in addition to the contactor 22 and means 16 of detecting the three dimensional position and rotation of the casing. In this case, the third software module 44 may be replaced by a module operating in the described manner when the peripheral is in its three dimensional operating mode, and operating in the same way as software used with conventional 2D mice when the peripheral is in its two dimensional operating mode. However, note that in this case, the size of the casing 10 is slightly increased and that it is impossible to change the rotation of the cursor 46 in two dimensional operating mode.

What is claimed is:

1. Input peripheral for a computer, comprising a mobile casing designed to be held in the user's hand and means of detecting the three dimensional position and rotation of the casing, comprising a two-state contactor located on one surface of the casing designed to be put down on a flat support so as to be automatically switchable between a first state corresponding to a two dimensional operating mode of the peripheral when the casing is placed on the support, and a second state corresponding to a three dimensional operating mode of the peripheral when the casing is lifted off the support and conversely.

2. Peripheral according to claim 1, in which the means of detecting the three dimensional position and rotation of the casing include an electromagnetic sensor mounted in the casing.

3. Peripheral according to claim 2, in which the means of detecting the three dimensional position and rotation of the casing also include an electronic preprocessing circuit outside the casing, connected to the electromagnetic sensor through an electric conductor.

4. Peripheral according to any claim 1, in which the casing is fitted with at least one button to start computer processing.

5. Peripheral according to claim 4, in which an electronic shaping circuit for signals output by the contactor and by the button is installed inside the casing.

6. Peripheral according to claim 1, in which the means of detecting the three dimensional position and rotation produces output signals representing the coordinates (x, y, z) and rotation ($\alpha$, $\beta$, $\gamma$) of the casing in a fixed orthonormal coordinate system R (O, i, j, k) related to the support and for which the axes i and j are in the plane of the support.

7. Interaction process between an input peripheral as defined in claim 6 and a computer display screen, comprising the following steps:

determine the operating mode of the peripheral;

calculate the coordinates x', y', z' and the rotations $\alpha'$, $\beta'$, $\gamma$ of a 3D cursor displayed on the screen (34) in an orthonormal coordinate system R' (O', i', j', k') related to a 3D virtual scene represented on the screen, starting from signals output by the means of detecting a three dimensional position and rotation, in three dimensional operating mode;

calculate the coordinates (x", y") and rotation ($\alpha$") of a 2D cursor in an orthonormal coordinate system R" (O", i", j", k") related to the screen, for which the i" and j" axes are located in the plane of the screen, starting from the signals output by the means of detecting the three dimensional position and rotation in two dimensional operating mode.

8. Process according to claim 7, in which in three dimensional operating mode, a movement of the casing in coordinate system R from a position P1 with coordinates ($x_1$, $y_1$, $z_1$) and rotations ($\alpha_1$, $\beta_1$, $\gamma_1$), to a position P2 with coordinates ($x_2$, $y_2$, $z_2$) and rotations ($\alpha_2$, $\beta_2$, $\gamma_2$), will displace the 3D cursor in the R' coordinate system from a position P'1 with coordinates ($x'_1$, $y'_1$, $z'_1$) and rotations ($\alpha'_1$, $\beta'_1$, $\gamma'_1$), to a position P'2 with coordinates ($x'_2$, $y'_2$, $z'_2$) and rotations ($\alpha'_2$, $\beta'_2$, $\gamma'_2$), calculated using the following relations:

$$x'_2 = x'_1 + Cx(x_2 - x_1)$$

$$y'_2 = y'_1 + Cy(y_2 - y_1)$$

$$z'_2 = z'_1 + Cz(z_2 - z_1)$$

$$\alpha'_2 = \alpha'_1 + C\alpha(\alpha_2 - \alpha_1)$$

$$\beta'_2 = \beta'_1 + C\beta(\beta_2 - \beta_1)$$

$$\gamma'_2 = \gamma'_1 + C\gamma(\gamma_2 - \gamma_1)$$

in which Cx, Cy, Cz, C$\alpha$, C$\beta$ and C$\gamma$ represent gains that can be configured in x, y, z, $\alpha$, $\beta$, $\gamma$ respectively.

9. Process according to claim 7, in which in two dimensional operating mode, moving the casing on the support in the R coordinate system from a position P1 with coordinates ($x_1$, $y_1$) and rotation $\gamma$, to a position P2 with coordinates ($x_2$, $y_2$) and rotation $\gamma_2$ will move the 2D cursor in the R" coordinate system from a position P"1 with coordinates ($x"_1$, $y"$) and rotation $\gamma"_1$ to a position P"2 with coordinates ($x"_2$, $y"_2$) and rotation $\gamma"_2$ calculated using the following relations:

$$x"_2 = x"_1 + Fx(x_2 - x_1)$$

$$y"_2 = y"_1 + Fy(y_2 - y_1)$$

$$\gamma"_2 = \gamma"_1 + F\gamma(\gamma_2 - \gamma_1)$$

in which Fx, Fy and F$\gamma$ are gains that can be configured in x, y and $\gamma$ respectively, position P1 being the initial position of the casing when the peripheral changes to two dimensional operating mode, position P"1 being the final position of the 2D cursor during the previous changeover from two dimensional operating mode to three dimensional operating mode.

10. Peripheral according to claim 2, in which the casing is fitted with at least one button to start computer processing.

11. Peripheral according to claim 2, in which the means of detecting the three dimensional position and rotation produces output signals representing the coordinates (x, y, z) and rotation ($\alpha$, $\beta$, $\gamma$) of the casing in a fixed orthonormal coordinate system R (O, i, j, k) related to the support and for which the axes i and j are in the plane of the support.

* * * * *